United States Patent
Winkelmann et al.

(10) Patent No.: US 11,084,951 B2
(45) Date of Patent: Aug. 10, 2021

(54) PROCESS FOR PREPARING AN AQUEOUS DISPERSION OF PIGMENT CONTAINING PARTICLES

(71) Applicant: BASF Colors & Effects GmbH, Ludwigshafen am Rhein (DE)

(72) Inventors: Marion Winkelmann, Ludwigshafen (DE); Yannick Fuchs, Ludwigshafen (DE); Murat Cetinkaya, Rijswijk (NL); Aaron Wagner, Ludwigshafen (DE); Paul Brown, Basel (CH); Steffen Onclin, Ludwigshafen (DE); Christof Kujat, Ludwigshafen (DE)

(73) Assignee: BASF Colors & Effects GmbH, Ludwigshafen am Rhein (DE)

( * ) Notice: Subject to any disclaimer, the term of this patent is extended or adjusted under 35 U.S.C. 154(b) by 158 days.

(21) Appl. No.: 16/605,700

(22) PCT Filed: Apr. 20, 2018

(86) PCT No.: PCT/EP2018/060170
§ 371 (c)(1),
(2) Date: Oct. 16, 2019

(87) PCT Pub. No.: WO2018/193083
PCT Pub. Date: Oct. 25, 2018

(65) Prior Publication Data
US 2020/0123405 A1 Apr. 23, 2020

(30) Foreign Application Priority Data
Apr. 21, 2017 (EP) .................................... 17167560

(51) Int. Cl.
*C09D 11/32* (2014.01)
*C09D 17/00* (2006.01)
*C09D 7/65* (2018.01)
*C09D 7/45* (2018.01)
*B01J 13/18* (2006.01)
*C09B 67/04* (2006.01)
*C09B 67/08* (2006.01)
*C09D 161/24* (2006.01)
*C09D 161/32* (2006.01)

(52) U.S. Cl.
CPC ............ *C09D 17/003* (2013.01); *B01J 13/18* (2013.01); *C09B 67/0002* (2013.01); *C09B 67/0013* (2013.01); *C09D 7/45* (2018.01); *C09D 7/65* (2018.01); *C09D 17/001* (2013.01); *C09D 161/24* (2013.01); *C09D 161/32* (2013.01)

(58) Field of Classification Search
CPC .......... C09D 17/003; C09D 7/65; C09D 7/45; C09D 17/001; C09D 161/24; C09D 161/32; C09D 161/28; C09D 11/322; C09D 11/037; C09D 11/102; C09D 11/103; C09D 11/106; C09B 67/00; C09B 67/0002; C09B 67/0013; C09B 67/0097; C08G 12/12; C08G 12/32; C08G 12/427; B01J 13/18

USPC ........................................................ 523/206
See application file for complete search history.

(56) References Cited

U.S. PATENT DOCUMENTS

| | | | |
|---|---|---|---|
| 4,898,696 A | 2/1990 | Sliwka | |
| 4,918,317 A | 4/1990 | Hess et al. | |
| 7,605,194 B2 * | 10/2009 | Ferencz | C08G 18/12 523/205 |
| 2003/0004226 A1 | 1/2003 | Hoffman et al. | |
| 2013/0065996 A1 | 3/2013 | Ganapathiappan et al. | |
| 2014/0011941 A1 | 1/2014 | Anton et al. | |
| 2020/0139331 A9 * | 5/2020 | Winkelmann | A61K 9/5089 |

FOREIGN PATENT DOCUMENTS

| | | |
|---|---|---|
| DE | 24 36 204 | 2/1975 |
| DE | 198 33 347 A1 | 1/2000 |
| DE | 198 35 114 A1 | 2/2000 |
| EP | 0 026 914 A1 | 4/1981 |
| EP | 0 218 887 A2 | 4/1987 |
| EP | 0 319 337 A1 | 6/1989 |
| EP | 0 383 337 A2 | 8/1990 |
| EP | 0 415 273 A2 | 3/1991 |
| GB | 431 168 | 7/1935 |

(Continued)

OTHER PUBLICATIONS

International Search Report dated May 17, 2018 in PCT/EP2018/060170 filed Apr. 20, 2018.

*Primary Examiner* — Hannah J Pak

(74) *Attorney, Agent, or Firm* — Oblon, McClelland, Maier & Neustadt, L.L.P.

(57) ABSTRACT

A process for preparing an aqueous dispersion of pigment particles is described. The pigment particle contains a pigment and an aminoplast resin which surrounds or embeds the pigment. The process includes (i) a step of subjecting an aqueous suspension of a pigment in the form of coarse particles to milling so that the coarse particles are comminuted in the presence of a polymeric dispersant to a particle diameter d(v 0.9) of below 1500 nm, as determined by laser diffraction; and (ii) a step of polycondensation of an aminoplast pre-condensate in the aqueous suspension of the comminuted particles of the pigment obtained in step (i) or during the milling of step (i). The polycondensation is performed in the presence of an acid catalyst at pH of below 5.5. The aqueous dispersion obtained by the process and the use of the aqueous dispersion for tinting waterborne liquid coating composition are also described.

16 Claims, No Drawings

(56) References Cited

FOREIGN PATENT DOCUMENTS

| GB | 1 462 455 | 1/1977 |
|----|-----------|--------|
| WO | WO 01/51197 A1 | 7/2001 |
| WO | WO 2005/000914 A1 | 1/2005 |
| WO | WO 2006/074969 A1 | 7/2006 |

* cited by examiner

PROCESS FOR PREPARING AN AQUEOUS DISPERSION OF PIGMENT CONTAINING PARTICLES

The present invention relates to a process for preparing aqueous dispersions of pigment particles, which contain a pigment and an aminoplast resin which surrounds or embeds the pigment. The invention also relates to the aqueous dispersions, which are obtainable by said process and the use of said aqueous dispersions for tinting waterborne liquid coating compositions.

Pigments are ordinarily organic or inorganic dry powders that incorporate a mixture of primary particles, aggregates and agglomerates. For both industrial and consumer coating compositions, whether solventborne or waterborne, the pigment should be dispersed homogeneously throughout the coating composition in order to ensure a uniform appearance of the final coating. In order to be properly dispersed, pigments are usually wetted, disaggregated and de-agglomerated in a vehicle to obtain a dispersion of the pigment particles. Wetting involves incorporation of the pigment into the vehicle replacing pigment-air interfaces with pigment-vehicle interfaces. Dispersants facilitate bringing pigments into a dispersed state as a result of surface activity at the pigment-solution interface. Dispersants will also temporarily stabilize the pigment dispersion against re-aggregating and re-agglomerating of the pigment particles. An ideal pigment dispersion consists of a homogenous suspension of pigment particles, after reducing the size of any aggregates and agglomerates.

Liquid pigment compositions containing pigments and fillers and a liquid vehicle are used in an almost unlimited number of different technical applications, in particular for colouring liquid coating compositions, including solvent and water-borne paints, heavy duty coatings, automotive coatings, or in printing inks, etc.

Pigments usually consist of solid particles ranging in diameter from about 0.02 to 2 μm. The pigment particles tend to have a strong affinity for each other and, unless stabilized, for example, by suitable dispersants, tend to clump together and form large agglomerates. Therefore, pigment particles and agglomerates can have average particle sizes sufficiently large to scatter visible light, thereby causing coatings to be hazy and dull. By contrast, pigments in the form of particles having particle sizes of 500 nm or lower, in particular 200 nm or lower (d(v 0.5) value) generally provide more intense, brighter colour, even when pigments of different colours are mixed to achieve intermediate colours. Agglomeration, however, is a serious problem for such pigments because surface area increases with the decrease of the particle size and consequently, surface tension and the tendency to agglomerate increases. Thus, acceptable dispersions of small particle pigments typically will normally require an inordinate amount of resinous grind vehicle and/or pigment dispersant to effect de-agglomeration and to prevent subsequent re-agglomeration. The presence of such high levels of resinous grind vehicles and pigment dispersants, however, can be detrimental to the resultant coating. For example, high levels of dispersants may contribute to water sensitivity of the resultant coating due to high polarity of such dispersants, while certain resinous grind vehicles can negatively impact coating performance properties such as chip resistance and flexibility.

When tinting a liquid base formulation with a liquid pigment dispersion, the liquid pigment dispersion becomes diluted by the paint vehicle, which may result in a destabilization and agglomeration of the pigment particles because the dispersant may become desorbed from the surface of the pigment particles. Moreover, interaction of the dispersants or pigment particles with the surfactants in the base formulation may cause agglomeration.

WO 2005/000914 suggests preparing aqueous dispersions of pigment nanoparticles by admixing nanoparticulate pigments with ethylenically unsaturated monomers and polymers in an aqueous medium, subjecting the mixture to high shear stress to form microparticles containing the monomers, the polymer and the pigment nanoparticles followed by free radical polymerization of the ethylenically unsaturated monomers. The process of WO 2005/000914 requires considerable amounts of polymers and only allows for the preparation of aqueous pigment dispersions containing a considerable amount of polymer, based on the amount of pigment and having a comparatively low concentration of the pigment.

US 2013/0065996 describes the preparation of aqueous dispersions of pigment particles encapsulated by a crosslinked polymer having a high dielectric constant, which comprises providing a pigment, which is functionalized with ethylenically unsaturated groups, followed by mixing the functionalized polymer with an ethylenically unsaturated hydrophobic monomer, a crosslinking monomer, a particle stabilizer, and a solvent, such as water, applying shear force to the mixture and effecting polymerization. The method is quite tedious, as it requires the functionalization of the surface of the pigment particles with vinylic groups. This method is tedious and does not allow the preparation of aqueous pigment dispersions on a large scale.

It has occasionally been described to embed pigment and dyes into a matrix of a crosslinked aminoplast polymer, in order to obtain pigment powders, which show improved compatibility with the materials to be tinted and/or improved stability against degradation.

For example, GB 431168 discloses the preparation of pigment powders by heating a pigment powder, which is dispersed in a solution of a urea-formaldehyde resin to obtain a suspension which is evaporated to a pigment containing powder. The obtained pigment powder is stable against degradation caused by water and light. The concentration of the pigment in the aminoplast polymer is quite small.

DE 2436204 describes the preparation of coated pigment powders by milling an aqueous suspension of pigment in the presence of an anionic protective colloid, in particular carboxymethylcellulose, adding to the suspension an aminoplast pre-condensate, heating the mixture to effect curing of the aminoplast pre-condensate and precipitating the coated pigment. The coated pigment powders are used for coloring plastics based on polyolefines.

One object of the present invention is to provide a method which allows for efficiently preparing aqueous dispersions of pigments having a small average particle size, i.e. a d(v 0.5) value of e.g. below 1000 nm, in particular at most 800 nm and especially at most 500 nm or at most 300 nm, which are stable, in particular against aggregation or agglomeration of the pigment particles and also against segregation from the aqueous phase. It is desired that the aqueous pigment dispersions can be easily incorporated into paint formulations, in particular into aqueous paint formulations. In particular, the pigment particles should be stabilized against aggregation without requiring large amounts of non-pigmentary materials.

It was surprisingly found that these and further objects are achieved by the method described herein. In particular, it was found that stable aqueous dispersions of pigments can be efficiently prepared by a process which comprises milling an aqueous suspension of coarse particles of an organic or inorganic pigment in the presence of a polymeric dispersant, in particular a non-ionic polymeric dispersant, in order to comminute the coarse particles of the pigment to a particle diameter d(v 0.9) to below 1500 nm, as determined by dynamic light scattering, and performing a polycondensation of an aminoplast pre-condensate in the aqueous suspension of the comminuted particles of the pigment during or after comminution, wherein the polycondensation is performed in the presence of an acid catalyst at pH below pH 5.5.

Thereby, stable aqueous dispersions of the pigment-polymer particles are obtained, which do not segregate from the aqueous phase or can be easily re-dispersed by agitation. In the thus obtained aqueous dispersions, the pigment particles are present in the form of microparticles, which contain the pigment and an aminoplast resin A which surrounds or embeds the pigment, thereby stabilizing the pigment particles against agglomeration.

Therefore, the present invention relates to a process for preparing aqueous dispersions of pigment-polymer particles containing a pigment and an aminoplast resin which surrounds or embeds the pigment, which comprises the following steps:

i) providing an aqueous suspension of a pigment in the form of coarse particles and subjecting the aqueous suspension to milling in order to comminute the coarse particles of the pigment in the presence of a polymeric dispersant to a particle diameter d(v 0.9) to below 1500 nm, in particular to below 1200 nm, more particularly to at most 1000 nm, especially to at most 700 nm, as determined by laser diffraction;

ii) performing a polycondensation of an aminoplast pre-condensate in the aqueous suspension of the comminuted particles of the pigment obtained in step i) or during the milling of step i), wherein the polycondensation is performed in the presence of an acid catalyst at pH below pH 5.5.

The process of the invention allows for efficiently preparing aqueous dispersions of pigment-polymer particles containing a pigment and an aminoplast resin. In the aqueous dispersions the pigment is present in the form of pigment-polymer particles which contain the pigment and an aminoplast resin. The aminoplast resin surrounds or embeds the one or more pigment particles and thereby stabilizes the pigment particles contained in the pigment-polymer particles against agglomeration. The dispersions are physically stable, e.g. the pigment-polymer particles do not segregate from the aqueous phase or can be easily re-dispersed by agitation of the dispersion. The aqueous dispersions obtained by the process of the invention can be easily incorporated into paint formulations, in particular into aqueous paint formulations. In the aqueous dispersions obtainable by the process of the invention, as well as in the paint formulations, which have been tinted by said aqueous dispersions, the pigment particles are stabilized against aggregation without requiring large amounts of non-pigmentary materials.

Therefore, a further aspect of the invention relates to aqueous dispersions of pigment—polymer particles, wherein the pigment-polymer particles contain a pigment and an aminoplast resin which surrounds or embeds the pigment, said dispersions being obtainable by the process as described herein.

Here and throughout the specification, the expression "wt %" as used herein means "% by weight".

Here and throughout the specification, the terms "milling" and "grinding", respectively, are used synonymously.

Here and throughout the specification, the terms "pigment-polymer particles" and "microparticles" are used synonymously and relate to particles which contain the pigment and an aminoplast resin which surrounds or embeds the pigment. The term "microparticle" indicates that the discrete particles have usually a particle size which does not exceed a few micrometers or is even lower, e.g. in the nanometer range. In particular, the term "microparticle" indicates a particle size of less than 5 μm, in particular less than 2 μm, especially at most 1.5 μm, given as d(v 0.9) value.

Here and throughout the specification, the terms "polyoxyalkylene group", "polalkyleneoxide group" and polyalkylene glycol group are used synonymously and relate to oligomeric or polymeric groups or moieties, which are made of alkyleneoxy repeating units, in particular from $C_2$-$C_4$-alkyleneoxide repeating units, i.e. repeating units of the formula A—O, where A is alkandiyl, in particular $C_2$-$C_4$-alkandiyl, such as 1,2-ethandiyl, 1,2-propandiyl, 1,2-butandiyl, 2,3-butandiyl or 1-methyl-1,2-propandiyl, and especially from ethyleneoxy ($CH_2CH_2O$) and/or propyleneoxy ($CH(CH_3)CH_2O$) repeating units. Polyoxyalkylene groups made of $C_2$-$C_4$-alkyleneoxide repeating units are hereinafter termed poly(oxy-$C_2$-$C_4$-alkylene) groups or poly-$C_2$-$C_4$-alkylene glycol groups, respectively. Polyoxyalkylene groups made of ethylene oxide and/or propylene oxide repeating units are hereinafter termed poly(oxy-$C_2$-$C_3$-alkylene) groups or poly-$C_2$-$C_3$-alkylene glycol groups, respectively. The polyoxyalkylene groups may be non-capped, e.g. it has a terminal OH group or it may be capped, which means that it bears a terminal O-bound hydrocarbon radical, such as $C_1$-$C_{12}$-alkyl, $C_3$-$C_{12}$-alkyl or benzyl.

Here and throughout the specification, the term "alkyl" relates to a linear or branched, saturated hydrocarbon radical having usually 1 to 12 carbon atoms, frequently, 1 to 6 carbon atoms, in particular 1 to 4 carbon atoms, such as methyl, ethyl, n-propyl, isopropyl, n-butyl, 2-butyl, isobutyl, tert.-butyl, n-pentyl, 2-pentyl, 1,2-dimethylpropyl, 2,2-dimethylpropyl, n-hexyl, 2-hexyl, 2,3-dimethylbutyl, n-heptyl, 2-heptyl, n-octyl, 2-octyl, 2-ethylhexyl, 2,4,4-trimethylpentyl, n-nonyl, 2-nonyl, n-decyl, 2-decyl, n-undecyl, 2-undecyl, n-dodecyl, 2-dodecyl and 2,4,4,6,6-pentamethyldecyl.

Here and throughout the specification, the term "cycloalkyl" relates to a mono- or polycyclic saturated hydrocarbon radical having usually 3 to 12 carbon atoms, frequently, 3 to 8 carbon atoms, in particular 5 to 6 carbon atoms, such as cyclopentyl, cyclohexyl, norbornyl or adamantyl.

In the context of particle size, the d(0.9) or d(v, 0.9) value of particle size indicates that 90 vol.-% of the particles have a hydrodynamic diameter smaller than this value. In the context of particle size, the average particle size d(0.5) or d(v 0.5) value, respectively, means that 50 vol.-% of the particles have a diameter which is above the value cited and 50 vol.-% of the particles have a diameter which is below the value cited. In the context of particle size, the d(0.1) or d(v 0.1) value indicates that 10 volume % of the particles have a hydrodynamic diameter below the value cited.

The particle size as referred herein, and also the particle size distribution, characterized by e.g. the d(v 0.1), d(v 0.5) and d(v 0.9) values, is the hydrodynamic diameter of the particles, e.g. the pigment particles as well as the pigment-polymer particles, which can be determined by techniques such as laser diffraction and dynamic light scattering (DLS). Dynamic light scattering, which is also termed quasi-elastic light scattering (QELS), is usually performed on diluted aqueous suspensions containing from 0.01 to 5% by weight of pigment-polymer particles. Laser diffraction is usually performed in accordance with ISO 13320:2009.

In the first step i) of the method of the present invention, an aqueous slurry or suspension of pigment in the form of coarse particles is provided, which are comminuted to the desired particle size by milling or grinding.

The term "coarse particle" means that the particles of the pigment are bigger than the particles usually contained in a pigment suspensions, which means that the d(v 0.9) value of the particles of the pigment generally exceeds 5 µm, and is in particular at least 10 µm or at least 20 µm and may range from 5 µm to 2000 µm, in particular in from 10 µm to 1000 µm or from 20 µm to 500 µm. Moreover, the d(v 0.1) value of coarse particles of the pigment in the aqueous slurry is frequently at least 2 µm.

The slurry of the pigment can be simply provided by suspending the pigment in water, which may or may not contain at least a portion of the polymeric dispersant. The aqueous slurry may also contain a portion or the total amount of the aminoplast pre-condensate used for encapsulation. Frequently, the aminoplast resin will be absent at least for a certain period or until the desired particle size has been achieved.

Usually, the amount of pigment is suspended such that the concentration of the pigment in the slurry prior to grinding is in the range of 5 to 60% by weight, in particular in the range of 7 to 55% by weight, especially 10 to 50% by weight of the total weight of the slurry.

By grinding the slurry, the pigment particles are comminuted and the particle size is reduced such that the d(v 0.9) value of the particles in the suspension is below 1500 nm, in particular to below 1200 nm, more particularly at most 1000 nm, especially at most 700 nm, e.g. in the range from 20 to 1500 nm, in particular in the range from 30 to 1200 nm, more particularly in the range from 50 to 1000 nm or in the range from 50 to 700 nm, as determined by laser diffraction. Preferably, grinding is performed such that the average particle diameter d(0.5) of the pigment is at most 1000 nm, in particular at most 800 nm, more particularly at most 500 nm, especially at most 300 nm or lower, e.g. in the range of 10 to 1000 nm, in particular in the range of 15 to 800 nm, more particularly in the range from 20 to 500 nm and especially in the range of 25 to 300 nm, as determined by laser diffraction.

Comminution of the pigment is achieved by any grinding or milling method suitable for achieving comminution of the pigment particles in an aqueous suspension, including in particular wet grinding techniques. Suitable grinding devices for wet grinding are e.g. tumbling mills, including ball mills and rod mills, stirred media mills, including agitator bead mills, rotor-stator mills and the like. Suitable wet grinding methods and grinding devices are known and have been described e.g. in Perry's Chemical Engineers' Handbook, 7$^{th}$ ed. McGraw Hill 1997, 20-31 to 20-38, and the literature cited therein, and are commercially available, e.g. from Netzsch Feinmahltechnik, FHZ GmbH, Hosokawa-Alpine A G, Willy A. Bachofen A G Maschinenfabrik and Bühler GmbH.

In particular embodiments of the invention, milling is carried out in a stirred media mill. In other words, grinding is performed by agitating the aqueous suspension of the pigment together with a media of hard particles, which are harder than the particles of the pigment, such that the particles of the pigment and the hard particles collide, and the pigment particles are broken in these collisions. The media of hard particles is also referred to as grinding media.

In the stirred media mill, the grinding media is stirred in a closed or open milling chamber, preferably open milling chamber. The preferred method of stirring is by means of a stirrer comprising a rotating shaft. The shaft may be provided with disks, arms, pins, or other grinding devices. The stirred media mill may be operated in a batch or continuous mode. The stirred media mill may be operated in a vertical or horizontal position, the latter being preferred.

Preferably, the stirred media mill is operated in a continuous mode in which the suspension is recirculated to the inlet of the mill. Recirculation of the product can be driven by conventional means, such as by employing a peristaltic pump. Preferably, the product is recirculated as quickly as possible to achieve a high number of turnovers. The required residence time for achieving the desired fineness will depend on several factors, such as the energy impact, the hardness of the material, the design of the milling apparatus and other features of the milling process mentioned above. However, a skilled person will be readily in the position to evaluate the required residence time by routine experiments.

Suitable grinding media for the practice of the present invention include metal beads and ceramic beads. Suitable metal beads include beads of carbon steel and beads of stainless steel. Preferred ceramic beads include beads of zirconium oxide, beads of yttrium or cerium stabilized zirconium oxide, beads of zirconium silicate, and beads of alumina. The preferred grinding media for the purpose of the invention are beads of yttrium stabilized zirconium oxide.

The grinding media used for particle size reduction are preferably spherical. The grinding media for the practice of the present invention preferably have an average size ranging from about 50 to 2000 microns (0.05 to 2.0 mm), more preferably from about 200 to 1000 microns (0.2 to 1.0 mm).

Preferably, the grinding media load measured as a volume percent of the mill chamber volume is 50 to 90%, more preferably 60 to 85%.

Stirred media mills are operated at tip speeds in the range of 3 to 20 m/s, preferably in the range of 5 to 15 m/s.

Milling may be performed by using a single milling device. However, it is also possible to combine two or more milling devices in series.

According to the invention, the grinding of the aqueous pigment slurry is performed in the presence of a polymeric dispersant. Suitable polymeric dispersants are known to a skilled person. A general survey on the different types of polymeric dispersants, their polymeric architecture and their properties is given by F. Pirrung and C. Auschra in Macromolecular Engineering, Precise Synthesis, Materials Properties, Applications (ed. K. Matyjaszewski et al.), chapter 4, Polymeric Dispersants, pp. 2135-2180.

Suitable polymeric dispersants for the purpose of the invention are principally organic polymers, which are soluble or at least dispersible in water, and which have at least one polar group which provides the water-solubility or dispersibility of the polymer and at least one anchoring group, which is capable of being adsorbed onto the surface of the pigment particle. Anchoring may be achieved through hydrogen bonding, dipole-dipole interactions, pi-pi interaction and London- or Van der Waals forces and combination of these.

Frequently, the polymeric dispersant is a non-ionic polymer. In particular, the polymeric dispersant is a non-ionic polymer which has at least one polyoxyalkylene group, in particular a poly(oxy-$C_2$-$C_4$-alkylene) group, more particularly a plurality of poly(oxy-$C_2$-$C_4$-alkylene) groups and especially a plurality of poly(oxy-$C_2$-$C_3$-alkylene) groups. The polyoxyalkylene group imparts water-solubility or dispersibility to the polymeric dispersant and serve for steric stabilization of the pigment particles against agglomeration in the aqueous phase. The molecular weight of the polyoxyalkylene groups may vary from 200 to 5000 g/mol (number average) which corresponds to a range from 3 to 110 oxyalkylene repeating units.

Suitable anchoring groups are in particular
aromatic heterocyclic radicals, such as pyridinyl, pyrimidinyl, triazinyl, pyrazolyl, imidazolyl, and triazolyl radicals, optionally substituted with 1, 2 or 3 radicals selected from $C_1$-$C_4$-alkyl, OH, amino ($NH_2$), aminosulfonyl ($SO_2NH_2$) and carbamoyl ($CONH_2$);
aryl radicals, such as phenyl or naphthyl, where aryl bears at least one, e.g. 1, 2 or 3 radical, which is selected from OH, amino ($NH_2$), aminosulfonyl ($SO_2NH_2$) and carbamoyl ($CONH_2$), and optionally 1, 2 or 3 radicals, which are selected from $C_1$-$C_4$-alkyl; and
lactamyl groups, such as pyrrolidone, caprolacton or morpholinone groups,
urethane or urea groups, including imidazolinone groups and triazintrione groups.

The polymeric dispersants are in particular selected from non-ionic polymers having a polyurethane backbone, where the polyoxyalkylene groups form part of the backbone or side chains, and non-ionic polymers having a carbon-backbone, where the polyoxyalkylene groups are present as side chains.

A particular group polymeric dispersants are selected from neutral comb polymers having a carbon-backbone, where the polyoxyalkylene groups are present as side chains. In particular, the polymeric dispersant is selected from comb polymers having both repeating units bearing poly-$C_2$-$C_4$-alkylene ether groups and repeating derived from vinyl pyridine units. These comb polymers are frequently made of polymerized repeating units of ethylenically unsaturated monomers M comprising in polymerized form at least one monoethylenically unsaturated monomer having an anchoring group (monomer M1), a monoethylenically unsaturated monomer bearing a poly(oxyalkylene) group, in particular a poly(oxy-$C_2$-$C_4$-alkylene) group and especially a poly(oxy-$C_2$-$C_3$-alkylene) group (monomer M2) and optionally a non-ionic monomer M3 different therefrom. It is apparent to a skilled person that these types of polymers can be made by polymerizing monomers M1, M2 and optionally M3, e.g. by radical polymerization, or by subjecting a polymer made of polymers M1 and M3 to a polymer analogue reaction with OH terminated poly(oxy-$C_2$-$C_4$-alkylene) ether, in particular monofunctional OH terminated poly(oxy-$C_2$-$C_4$-alkylene) ethers, especially a monofunctional OH terminated poly(oxy-$C_2$-$C_3$-alkylene) ether, provided that the monomers M3 have a functional group, which is capable of undergoing an esterification or trans-esterification reaction, e.g. a carboxyl group or a $C_1$-$C_6$-alkoxycarbonyl group.

Suitable monomers M1 are
N-vinyl lactams, such as N-vinyl pyrrolidone, N-vinylcaprolactam and N-vinyl;
vinyl or ally substituted heterocycles, such as vinylpyridines, N-vinyl imidazole, N-vinyltriazole and N-vinylpyrazole;
with particular preference given to N-vinylpyridines.

Suitable monomers M2 are e.g.
vinyl and ally ethers of poly(oxyalkylene) ethers, which are also termed polyoxyalkylene glycols, in particular of poly-$C_2$-$C_4$-alkylene glycols and especially of poly-$C_2$-$C_3$-alkylene glycols;
esters of acrylic acid with poly(oxyalkylene) ethers, in particular with poly(oxy-$C_2$-$C_4$-alkylene) ethers and especially with poly(oxy-$C_2$-$C_3$-alkylene) ethers and esters of methacrylic acid with poly(oxyalkylene) ethers, in particular with poly(oxy-$C_2$-$C_4$-alkylene) ethers and especially with poly(oxy-$C_2$-$C_3$-alkylene) ethers, which are hereinafter also termed polyalkylene glycol (meth)acrylate, poly-$C_2$-$C_4$-alkylene glycol (meth)acrylate and poly-$C_2$-$C_3$-alkylene glycol (meth) acrylate, respectively;
diesters of maleic acid or of fumaric acid with poly (oxyalkylene) ethers, in particular with poly(oxy-$C_2$-$C_4$-alkylene) ethers and especially with poly(oxy-$C_2$-$C_3$-alkylene) ethers.

In the aforementioned monomers M2, the poly(oxyalkylene) group may be non-capped, i.e. terminated by a hydroxy group or capped, i.e. terminated by an O bound hydrocarbon radical, e.g. $C_1$-$C_6$ alkyloxy group. For example, the poly(oxyalkylene) group is a $C_1$-$C_6$ alkyl terminated polyoxyethylene group or $C_1$-$C_6$ alkyl terminated polyethylene glycol group, respectively methyl terminated polyoxyethylene group or methyl terminated polyethylene glycol group, respectively.

The molecular weight of the poly(oxyalkylene) glycol group may vary from 200 to 5000 g/mol, corresponding to 3 to 110 oxyalkylene repeating units.

Amongst the aforementioned monomers M2, preference is given to esters of acrylic acid with poly(oxyalkylene) ethers, in particular with poly(oxy-$C_2$-$C_4$-alkylene) ethers and especially with poly(oxy-$C_2$-$C_4$-alkylene) ethers and esters of methacrylic acid with poly(oxyalkylene) ethers, in particular with poly(oxy-$C_2$-$C_4$-alkylene) ethers and especially with poly(oxy-$C_2$-$C_3$-alkylene) ethers. Particular preference is given to poly-$C_1$-$C_6$ alkyl terminated $C_2$-$C_4$-alkylene glycol (meth)acrylates, in particular to $C_1$-$C_6$ alkyl terminated poly-$C_2$-$C_3$-alkylene glycol (meth)acrylates and more particularly to $C_1$-$C_6$ alkyl terminated polyethylene glycol (meth)acrylates, especially to the corresponding methyl terminated polyalkylene glycol (meth)acrylates.

Suitable monomers M3 are e.g.
$C_1$-$C_8$-alkyl vinyl ethers and $C_1$-$C_8$-alkyl allyl ethers;
vinyl esters and allyl esters of $C_1$-$C_8$ alkanoic acids, such as vinyl acetate or vinyl propionate;
esters of acrylic acid and esters of methacrylic acid with $C_1$-$C_{12}$-alkanols, esters of acrylic acid and esters of methacrylic acid with $C_5$-$C_{12}$-cycloalkanols, in particular esters of acrylic acid and esters of methacrylic acid with $C_1$-$C_6$-alkanols, such as methyl acrylate, ethyl acrylate, n-propyl acrylate, n-butyl acrylate, isobutyl acrylate, tert.-butyl acrylate, methyl methacrylate, ethyl methacrylate, n-propyl methacrylate, n-butyl methacrylate, isobutyl methacrylate, tert.-butyl methacrylate;
vinylaromatic hydrocarbons such as styrene and vinyl toluene;
diesters of maleic acid with $C_1$-$C_{12}$-alkanols, such as dibutyl maleate and dibutyl fumarate.

Amongst the aforementioned monomers M3, preference is given to esters of acrylic acid with $C_1$-$C_{12}$-alkanols and esters of acrylic acid with $C_1$-$C_{12}$-alkanols, hereinafter referred to as $C_1$-$C_{12}$-alkyl (meth)acrylates. Particular preference is given to esters of acrylic acid with $C_1$-$C_6$-alkanols and esters of acrylic acid with $C_1$-$C_6$-alkanols, hereinafter referred to as $C_1$-$C_6$-alkyl (meth)acrylates.

In particular, the polymeric dispersants are selected from non-ionic polymers, where the repeating units essentially consist of a combination of polymerized monomers M1, M2 and optionally M3, where M1 is selected from the group consisting of vinyl pyridines, M2 is selected from the group consisting of $C_1$-$C_6$ alkyl terminated $C_2$-$C_4$-alkylene glycol (meth)acrylates, in particular from the group consisting of $C_1$-$C_6$ alkyl terminated poly-$C_2$-$C_3$-alkylene glycol (meth)acrylates and more particularly from the group consisting $C_1$-$C_6$ alkyl terminated polyethylene glycol (meth)acrylates, and M3 is selected from the group consisting of $C_1$-$C_{12}$-alkyl (meth)acrylates.

Especially, the polymeric dispersants are selected from non-ionic polymers, where the repeating units essentially consist of a combination of polymerized monomers M1, M2 and optionally M3, where M1 is selected from the group consisting of vinyl pyridines, M2 is selected from the group consisting of methyl terminated polyethylene glycol (meth)acrylates, and M3 is selected from the group consisting of $C_1$-$C_6$-alkyl (meth)acrylates.

These non-ionic polymers are known e.g. from WO 2006/074969.

Besides or instead of the aforementioned non-ionic polymeric dispersant, the suspension of the pigment which is subjected to step i) may contain one or more polymeric dispersants different from the aforementioned non-ionic polymeric dispersants. Suitable polymeric dispersants include in particular anionic polymeric dispersants. Anionic polymeric dispersants are water-soluble polymers, which contain a plurality of anionic groups, such as carboxylate groups, sulfonate groups, phosphonate groups, sulfate groups and/or phosphate groups. The anionic groups in these anionic polymeric dispersants may be partially or fully neutralized. Suitable counter ions are alkali metal ions, such as sodium, potassium, earth alkaline ions, such as magnesium or calcium, and ammonium. In case of anionic polymeric surfactants having a sulfonate group, the anionic groups are preferably at least partly neutralized.

Suitable anionic polymeric dispersants are e.g.

anionically modified, water-soluble polysaccharides, such as carboxymethyl cellulose, lignin based sulfonic acids, such as lignosulfonic acid, ethoxylated lignosulfonic acid or oxidized lignins, arylsulfonic acid formaldehyde condensates and arylsulfonic acid formaldehyde urea condensates, such as naphthalene sulfonic acid formaldehyde condensates, phenol sulfonic acid formaldehyde condensates, cresol sulfonic acid formaldehyde condensates, etc., homo- and copolymers of ethylenically unsaturated monomers which frequently comprise at least 20% by weight, based on the total amount of the monomers, of at least one ethylenically unsaturated monomer which comprises at least one carboxy group, sulfonic acid group, and/or phosphonic acid group incorporated within the polymer, and salts of these, in particular the alkali metal salts and ammonium salts. When the abovementioned anionic water-soluble polymers are in an aqueous medium, the sulfonic acid groups or phosphonic acid groups bonded to the main polymer chain are generally in the salt form, i.e. in the form of sulfonate groups, the phosphonic acid groups correspondingly being in the form of phosphonate groups. The counterions are then typically alkali metal ions and alkaline earth metal ions, examples being sodium ions, and calcium ions, and ammonium ions ($NH_4+$).

Frequently, the non-ionic polymeric dispersants contribute to at least 50% by weight, in particular at least 80% by weight to the total amount of polymeric dispersants present in the aqueous suspension subjected to step i). In particular, non-ionic polymeric dispersants are the only dispersants present in the suspension subjected to step i).

Generally, the polymeric dispersant is used in an amount from 0.1 to 4.0 parts by weight, in particular from 0.2 to 2.0 parts and especially from 0.3 to 1.3 parts per 1 part of the pigment. The concentration of polymeric dispersant in the suspension subjected to step i) is usually in the range of 1 to 60% by weight, in particular from 3 to 55% by weight and especially from 5 to 50% by weight, based on the total weight of the suspension subjected to step i).

The pigment can be principally any organic or inorganic pigment or a mixture of pigments, which is solid and which is essentially insoluble in water. Organic pigments are characterized by having a chromophore that changes the color of reflected or transmitted light as the result of wavelength-selective absorption. The chromophore of organic pigments is usually a conjugated polycyclic pi-electron system having at least 10 pi-electrons. The pigments may be single chemical compounds or mixtures of a plurality of components, including solid solutions or mixed crystals containing a plurality of chemical compounds. Preference is given to uniformly crystalline pigments as they usually yield greater color saturation than physical mixtures and mixed phases. If duller shades are nevertheless desired in the final application, this may be achieved by toning down with colorants of different color in a manner known per se.

The pigment is preferably a solid organic or inorganic pigment. Solid means that the melting point of the pigment is higher than ambient temperature. In particular, the melting point of the pigment is at least 50° C., in particular at least 60° C. or at least 70° C. and especially at least 80° C., e.g. from 50 to 300° C. or from 60 to 300° C. or from 70 to 300° C. or from 80 to 300° C.

Generally, the pigment is essentially water-insoluble. Essentially water-insoluble means that the solubility of the pigment in deionized water is at most 1 g/L at 22° C. and 1 bar.

Suitable pigments are e.g. monoazo pigments, disazo pigments, disazo condensation pigments, anthanthrone pigments, anthraquinone pigments, anthrapyrimidine pigments, quinacridone pigments, quinophthalone pigments, diketopyrrolopyrrole pigments, dithioketopyrrolopyrrol pigments, dioxazine pigments, flavanthrone pigments, indanthrone pigments, isoindoline pigments, isoindolinone pigments, isoviolanthrone pigments, metal complex pigments from the group of azo metal complex pigments and azomethine metal complex pigments, perinone pigments, perylene pigments, phthalocyanine pigments, pyranthrone pigments, pyrazoloquinazolone pigments, indigo pigments, thioindigo pigments, triarylcarbonium pigments.

Suitable examples of pigments include the following:

Monoazo pigments, such as C.I. Pigment Yellow 1, 3, 62, 65, 73, 74, 97, 183 and 191; C.I. Pigment Orange 5, 38 and 64; C.I. Pigment Red 1, 2, 3, 4, 5, 23, 48:1, 48:2, 48:3, 48:4, 49, 49:1, 51, 51:1, 52:1, 52:2, 53, 53:1, 53:3, 57:1, 58:2, 58:4, 63, 112, 146, 148, 170, 184, 187, 191:1, 210, 245, 247 and 251;

Disazo pigments, such as C.I. Pigment Yellow 12, 13, 14, 16, 17, 81, 83, 106, 113, 126, 127, 155, 170, 174, 176 and 188; C.I. Pigment Orange 16, 34 and 44;

Disazo condensation pigments, such as C.I. Pigment Yellow 93, 95 and 128; C.I. Pigment Red 144, 166, 214, 220, 221, 242 and 262; C.I. Pigment Brown 23 and 41;

Anthanthrone pigments, such as C.I. Pigment Red 168;

Anthraquinone pigments, such as C.I. Pigment Yellow 147 and 199; C.I. Pigment Red 177;

Anthrapyrimidine pigments, such as C.I. Pigment Yellow 108;

Benzimidazolone pigments, such as C.I. Pigment Yellow 120, 151, 154, 180, 181; C.I. Pigment Orange 36 and 72, C.I. Pigment Red 175, 185, 208; C.I. Pigment Brown 25; C.I. Pigment Violet 32;

Quinacridone pigments, such as C.I. Pigment Orange 48 and 49; C.I. Pigment Red 122, 202, 206 and 209; C.I. Pigment Violet 19;

Quinophthalone pigments, such as C.I. Pigment Yellow 138;

Diketopyrrolopyrrole pigments, such as C.I. Pigment Orange 71, 73 and 81; C.I. Pigment Red 254, 255, 264, 270 and 272;

Dioxazine pigments, such as C.I. Pigment Violet 23;

Flavanthrone pigments, such as C.I. Pigment Yellow 24;

Indanthrone pigments, such as C.I. Pigment Blue 60 and 64;

Isoindoline pigments, such as C.I. Pigment Yellow 139 and 185; C.I. Pigment Orange 61 and 69, C.I. Pigment Red 260;

Isoindolinone pigments, such as C.I. Pigment Yellow 109, 110 and 173;

Isoviolanthrone pigments, such as C.I. Pigment Violet 31;

Metal complex pigments, such as C.I. Pigment Red 257; C.I. Pigment Yellow 117, 129, 150, 153 and 177; C.I. Pigment Green 8;

Perinone pigments, such as C.I. Pigment Orange 43; C.I. Pigment Red 194;

Perylene pigments, such as C.I. Pigment Red 123, 149, 178, 179 and 224; C.I. Pigment Violet 29; C.I. Pigment Black 31 and 32;

Phthalocyanine pigments, such as C.I. Pigment Blue 15, 15:1, 15:2, 15:3, 15:4, 15:6, 16; and C.I. Pigment Green 7, 36;

Pyranthrone pigments, such as C.I. Pigment Orange 51; C.I. Pigment Red 216;

Pyrazoloquinazolone pigments, such as C.I. Pigment Orange 67 and C.I. Pigment Red 216;

Thioindigo pigments, such as C.I. Pigment Red 88 and 181; C.I. Pigment Violet 38;

Triarylcarbonium pigments, such as C.I. Pigment Red 81, 81:1 and 169; C.I. Pigment Violet 1, 2, 3 and 27; C.I. Pigment Blue 1, 61 and 62; C.I. Pigment Green 1;

C.I. Pigment Black 1 (Aniline black);

C.I. Pigment Yellow 101 (Aldazine yellow); and

C.I. Pigment Brown 22.

Inorganic pigments include, but are not limited to white pigments, such as titanium dioxide (C.I. Pigment White 6), including crystal forms or modifications thereof, such as rutil or anatas, zinc white, pigment grade zinc oxide, zinc sulfide and lithopone;

black pigments, such as iron oxide black (C.I. Pigment Black 11), iron-anganese black, spinel black (C.I. Pigment Black 27), carbon black (C.I. Pigment Black 7), graphite (C.I. Pigment Black 10) and chromium-iron-black (P. Brown 29);

inorganic colored pigments, such as chromium oxide, chromium oxide hydrate green, chrome oxide green (C.I. Pigment Green 48), cobalt green (C.I. Pigment Green 50), ultramarine green, cobalt blue (C.I. Pigment Blue 28 und 36; C.I. Pigment Blue 72), ultramarine blue, blue manganese, ultramarine violet, cobalt- and manganese violet, red iron oxide (C.I. Pigment Red 101), cadmium sulfoselenides (C.I. Pigment Red 108), cerium sulfide (C.I. Pigment Red 265), molybdenum red (C.I. Pigment Red 104), ultramarine red, brown iron oxide (C.I. Pigment Brown 6 und 7), mixed brown, spinel phases and corundum phases (C.I. Pigment Brown 29, 31, 33, 34, 35, 37, 39 und 40), chromium titanium yellow (CI Pigment Brown 24), chromium orange, cerium sulfide (C.I. Pigment Orange 75), yellow iron oxide (CI Pigment Yellow 42), nickel titanium yellow (C.I. Pigment Yellow 53; C.I. Pigment Yellow 157, 158, 159, 160, 161, 162, 163, 164 und 189), chromium titanium yellow; spinel phases (CI Pigment Yellow 119), cadmium sulfide and cadmium zinc sulfide (CI Pigment Yellow 37 and 35), chromium yellow (CI Pigment Yellow 34) and bismuth vanadate (CI Pigment Yellow 184).

In particular, the pigments are selected from organic pigments, more particular from the group consisting of disazo pigments, disazo condensation pigments, quinacridone pigments, diketopyrrolopyrrole pigments, dioxazine pigments, isoindoline pigments, isoindolinone pigments, perylene pigments, phthalocyanine pigments, and mixtures thereof.

Besides the pigment, the polymeric dispersant and water, the aqueous suspension may contain a portion of the aminoplast pre-condensate and other water-soluble ingredients. If an aminoplast pre-condensate is present, the pH of the aqueous suspension during step i) is preferably chosen such that no significant polycondensation of the aminoplast pre-condensate occurs during at least the beginning of step i). In particular, the pH of the aqueous suspension during step i) is preferably chosen such that no significant polycondensation of the aminoplast pre-condensate occurs, until the desired particle size of the pigment is achieved. In particular, the pH during this phase is at least pH 6, e.g. from pH 6 to pH 9.

According to step ii) of the invention, a polycondensation of an aminoplast pre-condensate is performed in the aqueous suspension obtained in step i) or during the milling of step i).

Suitable aminoplast pre-condensates are oligomeric or polymeric condensation products of one or more aldehydes, such as formaldehyde, acetaldehyde, propanal, glyoxal or glutaraldehyde, with one or more amino compounds having usually at least two primary amino groups, such as urea, thiourea, melamine, which may be wholly or partially etherified, cyanoguanamine (=dicyandiamide) and benzoguanamine. Upon applying curing conditions they form crosslinked aminoplast polymers. Aminoplast pre-condensates include, but are not limited to condensation products of melamine and formaldehyde (melamine-formaldehyde pre-condensates or MF pre-condensates), including wholly or partially etherified melamine-formaldehyde condensates, urea-formaldehyde pre-condensates (UF pre-condensates), thiourea-formaldehyde pre-condensates (TUF pre-condensates), pre-condensates of melamine, urea and formaldehyde (MUF pre-condensates), including wholly or partially etherified melamine-urea-formaldehyde condensates, pre-condensates of melamine, thiourea and formaldehyde (MTUF pre-condensates), including partially etherified melamine-thiourea-formaldehyde condensates, urea-glutaraldehyde pre-condensates, benzoguanamine-formaldehyde pre-condensates, dicyandiamide formaldehyde pre-condensates and urea-glyoxal pre-condensates.

Suitable aminoplast pre-condensates for microencapsulation are known and can be found, inter alia, in Kirk-Othmer, Encyclopedia of Chemical Technology, 3rd edition, Vol. 2, pp. 440-469, the prior art cited in the introductory part, U.S. Pat. No. 4,918,317, EP 26914, EP 218887, EP 319337, EP 383,337, EP 415273, DE 19833347, DE 19835114 and WO 01/51197. Suitable pre-condensates are commercially available, e. g. Cymel types, such as but not limited to Cymel® 303, 327, 328 or 385 (etherified melamine formaldehyde resins of Cytec), Maprenal® types, such as but not limited to Maprenal® MF 900w/95, MF 915/751 B, MF 920/75WA, MF 921w/85WA, (etherified melamine formaldehyde resins of Ineos), Kauramin® types of BASF SE, such as but not limited to Kauramin® 783, Kauramin® 792 or Kauramin® 753 (melamine formaldehyde resins), Kauramin® 620 or Kauramin® 621 (melamine urea formaldehyde resins), Kaurit® types of BASF SE, such as but not limited to Kaurit® 210, 216, 217, 220, 270, 285, 325 (aqueous solution of urea formaldehyde resins), Luracoll® types, such as Luracoll® SD (etherified melamine formaldehyde resins), Luwipal® types, such as but not limited to Luwipal® 063, Luwipal® 069 (etherified melamine formaldehyde resins), or Plastopal® types, such as but not limited to Plastopal® BTM, Plastopal® BTW (etherified urea formaldehyde resins).

In suitable urea-formaldehyde or thiourea-formaldehyde pre-condensates, the molar ratios of urea or thiourea to formaldehyde are generally in the range of 1:0.8 to 1:4, in particular in the range of 1:1.5 to 1:4, especially in the range of 1:2 to 1:3.5.

In suitable melamine-formaldehyde or melamine-(thio) urea-formaldehyde pre-condensates, the molar ratios of melamine to formaldehyde are generally in the range of 1:1.5 to 1:10, in particular in the range of 1:3 to 1:8 preferably in the range of 1:4 to 1:6.

In suitable melamine-formaldehyde or melamine-(thio) urea-formaldehyde pre-condensates, the molar ratios of melamine+urea or thiourea to formaldehyde are generally in the range of 1:0.8 to 1:9, in particular from 1:2 to 1:8, preferably in the range of 1:3 to 1:6. The molar ratio of urea or thiourea to melamine is usually in the range of 5:1 to 1:50 and in particular in the range of 30:1 to 1:30.

The pre-condensates may be used in the form of etherified pre-condensates of amino compound and aldehyde. In these etherified pre-condensates the methylol groups formed by the reaction of the amino groups with formaldehyde with an alkanol or an alkandiol, in particular with a $C_1$-$C_4$-alkanol, such as methanol, ethanol, n-propanol or n-butanol, in particular methanol, or a $C_2$-$C_4$-alkandiol, such as ethylene glycol. The degree of etherification of these resins can be adjusted by the molar ratio of amino groups to alkanol which is typically in the range of 10:1 to 1:10, preferably in the range of 2:1 to 1:5.

The pre-condensates are especially selected from the group consisting of melamine-formaldehyde pre-condensates, including wholly or partially etherified melamine-formaldehyde pre-condensates, and urea-formaldehyde pre-condensates and mixtures thereof. Especially, the pre-condensate is a wholly or partially etherified melamine-formaldehyde condensate, which may contain small amounts, e.g. 1 to 20 mol.-%, based on melamine, of urea.

The amount of aminoplast pre-condensate used for the polycondensation is usually in the range from 1 to 60% by weight, in particular from 2 to 50% by weight and especially from 5 to 40% by weight, based on the total weight of the pigment.

In step ii) the concentration of the aminoplast pre-condensate in the suspension subjected to step ii) is frequently in the range of 0.3 to 30% by weight, in particular from 0.5 to 20% by weight, based on the total weight of the suspension.

According to the invention, the polycondensation of step ii) may be performed after step i) has be terminated or at least partly during step i). Preferably, the polycondensation of step ii) will not start before the desired particle size of the pigment has been achieved. However, it is possible to continue comminution during the polycondensation of step ii).

While it is preferred to add the major portion or the total amount of the aminoplast pre-condensate used for encapsulation of the pigment after the desired particle size has been achieved, it is possible to perform step i) in the presence of the aminoplast pre-condensate. If an aminoplast pre-condensate is present in step i), the pH and temperature of the aqueous suspension during step i) is preferably chosen such that no significant polycondensation of the aminoplast pre-condensate occurs during at least the beginning of step i). In particular, the pH and temperature of the aqueous suspension during step i) is preferably chosen such that no significant polycondensation of the aminoplast pre-condensate occurs, until the desired particle size of the pigment is achieved. In particular, the pH during this phase is at least pH 6, e.g. from pH 6 to pH 9 during step i).

At the beginning of step ii) at least a portion or the total amount of aminoplast pre-condensate is present in the suspension obtained from step i) and subjected to the polycondensation. It is also possible that a portion of the aminoplast pre-condensate subjected to the polycondensation of step ii) is added during step ii) under conditions, where the polycondensation takes place. Usually, at least 50%, especially at least 70% or at least 90% or the total amount of the aminoplast pre-condensate subjected to the polycondensation of step ii) is present at the beginning of step ii), in particular before the conditions for effecting the polycondensation are established. Usually, at least 50%, especially at least 70% or at least 90% or the total amount of the aminoplast pre-condensate subjected to the polycondensation of step ii) is added to the aqueous suspension obtained in step i) after step i) has been terminated, i.e. after the desired particle size has been achieved.

The polycondensation of the aminoplast pre-condensate can be effected in a well-known manner, e.g. by heating the aqueous suspension obtained in step i) to a certain reaction temperature, at a pH of at most pH 5.5, where the polycondensation at the reaction temperature occurs. During the polycondensation, the aminoplast pre-condensate is converted into a water-insoluble aminoplast resin, which precipitates from the aqueous phase and deposits preferably on the surface of the solid particles pigment material thereby embedding or surrounding the pigment particles to obtain pigment-polymer particles.

According to the invention, the polycondensation of the aminoplast is performed at a pH of at most pH 5.5, in particular at a pH of at most pH 5, especially at a pH of at most pH 4, e.g. in the range of pH 0 to 5, more particularly in the range from pH 1 to 4 or in the range from pH 2 to 4.

The pH of the aqueous suspension is usually adjusted by addition of suitable amounts of an organic or inorganic acid, such as sulfuric acid, hydrochloric acid, phosphoric acid, a carboxylic acid including alkanoic acids, alkandioic acids or hydroxycarboxylic acids, such as formic acid, acetic acid, propionic acid, oxalic acid, malic acid or citric acid, and alkyl or arylsulfonic acids, such as methanesulfonic acid or toluenesulfonic acid. Preferably, the acid catalyst is selected from the group consisting of formic acid, sulfuric acid, methane sulfonic acid and hydrochloric acid. It is preferred, but not mandatory, if at least a portion, in particular the majority of the acid, is present in the aqueous suspension, before the aqueous suspension is heated to the reaction temperature.

Preferably, the polycondensation of the aminoplast pre-condensate is performed at elevated temperature, in particular at a temperature of at least 30° C., in particular at least 40° C. and may be as high as 100° C. or 90° C. Preferably, the temperature where polycondensation of the aminoplast pre-condensate is performed does not exceed 60° C., in particular 55° C. and is in particular in the range of 35 to 60° C. or in the range of 40 to 55° C. It may be possible to effect the start of the polycondensation of the aminoplast at a comparatively low temperature, e.g. a temperature in the range of 30 to 45° C., and then complete the polycondensation reaction at a higher temperature of e.g. 40 to 60° C. or 45 to 55° C.

The time for completing the polycondensation may vary, depending on the reactivity of the pre-condensate, the temperature and the pH of the aqueous suspension and may take from 1 h to 24 h, in particular from 2 h to 18 h.

Preferably, steps i) and ii) are performed successively. It is, however, also possible to combine steps i) and ii), i.e. to perform polycondensation while the pigment is still comminuted to the desired particle size. However, as pointed out above, it is preferred to start the polycondensation not before the desired particle size has been achieved, i.e. the d(v 0.9) value of the particles in the suspension is below 1500 nm, in particular to below 1200 nm, more particularly at most 1000 nm, especially at most 700 nm, as determined by laser scattering, which means that steps i) and ii) are performed successively.

If steps i) and ii) are performed successively, one will perform step i) first, until the desired particle size of the pigment is achieved, i.e. the d(v 0.9) value of the particles in the suspension is below 1500 nm, in particular to below 1200 nm, more particularly at most 1000 nm, especially at most 700 nm, as determined by laser scattering. Then step ii) is performed by effecting the polycondensation of the aminoplast pre-condensate as described above.

If steps i) and ii) are performed successively, the first step is performed in a milling device suitable for wet milling of an aqueous pigment suspension, in particular in a stirred media mill, as described above, until the desired particle size is achieved. The polycondensation of step ii) may then be performed in a separate vessel, i.e. the obtained suspension of the comminuted pigment is transferred into a separate reaction, e.g. a stirred vessel, where the polycondensation is effected as described above. However, it is also possible to continue milling during polycondensation of step ii), i.e. to perform step ii) in a milling device suitable for wet milling of an aqueous pigment suspension.

In a preferred embodiment of the invention, the polycondensation of step ii) is performed while still milling, i.e. the aqueous suspension is milled during polycondensation of step ii).

If steps i) and ii) are combined in a single step, polycondensation of step ii) is performed before the desired particle size of the pigment has been achieved. It is not necessary to start polycondensation together with comminution. Rather, one will preferably start with the comminution of step i) and continue comminution of the pigment, while starting the polycondensation of step ii) at a later time. In particular, the aqueous suspension of the coarse pigment particles is subjected to step i) until a certain fineness of the particles in the suspension is achieved and then polycondensation is started by lowering pH and/or by increasing the temperature, while still further performing means for comminuting the particles. For example, the aqueous suspension of the coarse pigment particles transferred to a milling device, e.g. an agitated media mill and subjected to comminution, until the d(0.9) value is below 1500 nm, in particular to below 1200 nm, more particularly at most 1000 nm, especially at most 700 nm, as determined by laser scattering, and then the suspension is heated, e.g. to a temperature of at least 30° C. or at least 40° C., and the pH of the suspension is lowered, e.g. to a pH of at most 5.5, in particular at most 4.0, while further subjecting the suspension to comminution in the milling device, e.g. agitated media mill. It is also possible, for example, to transfer the slurry of step i.) to a milling device, e.g. an agitated media mill and subjected to comminution, until the d(0.9) value is below 1500 nm, in particular to below 1200 nm, more particularly at most 1000 nm, especially at most 700 nm, as determined by laser scattering, discharging the suspension from the milling device, followed by effecting the conditions for polycondensation, e.g. by heating the suspension, e.g. to a temperature of at least 30° C. or at least 40° C., and lowering the pH of the suspension, e.g. to a pH of at most 5.0, in particular at most 4.0, and then recharging the suspension to the milling device and subjecting the suspension to comminution in the milling device.

The thus obtained aqueous suspension of the pigment-polymer particles may be neutralized by the addition of a base. Preferably, the pH of the suspension is adjusted to a pH of at least 6, e.g. a pH in the range of pH 6 to 10, in particular in the range of pH 6.5 to 9.0. Suitable bases include, but are not limited to organic amines, in particular water soluble amines, such as mono-, di- and triethanol amine. However, inorganic basis, such as potassium hydroxide or sodium hydroxide may be used.

The aqueous dispersions of pigment-polymer particles, which are obtainable by the process of the present invention, are novel and also form part of the present invention. In these aqueous dispersions, the pigment-polymer particles contain a pigment and an aminoplast resin which surrounds or embeds the pigment.

In the aqueous dispersions of pigment-polymer particles, the particle diameter d(v 0.9) of the pigment-polymer particles is usually below 2.0 µm, in particular at most 1.5 µm and especially at most 1.0 µm, or at most 500 nm, e.g. in the range from 20 to 2000 nm, in particular from 30 to 1500 nm, more particularly in the range from 50 to 1000 nm or from 50 to 500 nm, as determined by laser scattering.

In the aqueous dispersions of pigment-polymer particles, the average particle diameter d(v 0.5) pigment-polymer particles is frequently in the range from 10 to 1000 nm, in particular in the range from 15 to 700 nm and especially in the range from 20 to 500 nm as determined by laser scattering.

The aqueous dispersions of pigment-polymer particles further contain at least one polymeric dispersant as defined above, in particular a non-ionic polymeric dispersant as defined above. In particular, the polymeric dispersant contained in the aqueous dispersions of pigment-polymer particles is a non-ionic polymer which has at least one poly-oxyalkylene group, in particular a poly(oxy-$C_2$-$C_4$-alkylene) group, more particularly a plurality of poly(oxy-$C_2$-$C_4$- alkylene) groups and especially a plurality of poly(oxy-$C_2$-$C_3$-alkylene) groups. More particularly, the aqueous dispersions of pigment-polymer particles contain at least one polymeric dispersant selected from neutral comb polymers having a carbon-backbone, where the polyoxyalkylene groups are present as side chains. In particular, the polymeric dispersant is selected from comb polymers having both repeating units bearing poly-$C_2$-$C_4$-alkylene ether groups and repeating derived from vinyl pyridine units.

Especially, the polymeric dispersant contained in the aqueous dispersions of pigment-polymer particles is selected from non-ionic polymers, where the repeating units essentially consist of a combination of polymerized monomers M1, M2 and optionally M3, where M1 is selected from the group consisting of vinyl pyridines, M2 is selected from the group consisting of $C_1$-$C_6$ alkyl terminated $C_2$-$C_4$-alkylene glycol (meth)acrylates, in particular from the group consisting of $C_1$-$C_6$ alkyl terminated poly-$C_2$-$C_3$-alkylene glycol (meth)acrylates and more particularly from the group consisting of $C_1$-$C_6$ alkyl terminated polyethylene glycol (meth)acrylates, and M3 is selected from the group consisting of $C_1$-$C_{12}$-alkyl (meth)acrylates.

Especially, the polymeric dispersants are selected from non-ionic polymers, where the repeating units essentially consist of a combination of polymerized monomers M1, M2 and optionally M3, where M1 is selected from the group consisting of vinyl pyridines, M2 is selected from the group consisting of methyl terminated polyethylene glycol (meth)acrylates, and M3 is selected from the group consisting of $C_1$-$C_6$-alkyl (meth)acrylates.

Frequently, the non-ionic polymeric dispersant contained in the aqueous dispersions of pigment-polymer particles contribute to at least 50% by weight, in particular at least 80% by weight to the total amount of polymeric dispersant present in the aqueous dispersions of pigment-polymer particles. In particular, non-ionic polymeric dispersants are the only dispersants present in the dispersions of pigment-polymer particles.

Generally, the amount of polymeric dispersants contained in the aqueous dispersions of pigment-polymer particles is from 0.1 to 4.0 parts by weight, in particular from 0.2 to 2.0 parts and especially from 0.25 to 1.3 parts per 1 part of the pigment-polymer particles.

From the aqueous suspension obtained by the process as described herein, the pigment-polymer particles can be isolated, e.g. by filtration or centrifugation, or the aqueous suspension may be spray-dried, granulated or freeze-dried, to obtain a solid composition in the form of a powder or granules. The solid composition may be re-dispersed or formulated by using formulation auxiliaries as described below.

Customary formulation auxiliaries include, e.g., viscosity-modifying additives (thickeners), antifoam agents, preservatives, buffers, inorganic dispersants, etc., which are usually employed in aqueous formulations. Such auxiliaries may be incorporated into the aqueous dispersion, after step ii) of the preparation process described herein has been carried out. The amount of additives will generally not exceed 10% by weight, in particular 5% by weight of the total weight of the aqueous dispersion of pigment polymer-particles.

Antifoam agents suitable for the compositions according to the invention are, for example, silicone emulsions (such as, for example, Silicone SRE-PFL from Wacker or Rhodorsil® from Bluestar Silicones), polysiloxanes and modified polysiloxanes including polysiloxane blockpolymers, such as FoamStar® SI and FoamStar® ST products of BASF SE, long-chain alcohols, fatty acids, organofluorine compounds and mixtures thereof.

Suitable preservatives to prevent microbial spoiling of the compositions of the invention include formaldehyde, alkyl esters of p-hydroxybenzoic acid, sodium benzoate, 2-bromo-2-nitropropane-1,3-diol, o-phenylphenol, thiazolinones, such as benzisothiazolinone, 5-chloro-2-methyl-4-isothiazolinone, pentachlorophenol, 2,4-dichlorobenzyl alcohol and mixtures thereof. Commercially available preservatives that are based on isothiazolinones are for example marketed under the trademarks Proxel® (Arch Chemical), Acticide® MBS (Thor Chemie) and Kathon® MK (Rohm & Haas).

The aqueous dispersion of pigment particles of the present invention and also the powders obtained therefrom can be used for tinting materials. They are particularly useful for tinting water based liquid coating compositions, such as water-based inks and waterborne paints.

The aqueous dispersion of pigment-polymer particles and the powders obtained therefrom may be formulated as a pigment paste. Such a pigment paste contains the pigment-polymer particles, the dispersant and an aqueous diluent and optionally additives and can, if required, be combined with additional binders for use in the coating formulation.

The aqueous dispersions of pigment-polymer particles of the invention and the powders obtained therefrom provide for good application properties, such as high color strength, good dispersability in a multitude of liquid aqueous compositions. They are particularly useful for tinting waterborne coating compositions. They are particularly compatible with aqueous latex paints.

Suitable materials, which can be tinted or colored with the aqueous dispersions of pigment-polymer particles of the invention, include architectural coatings, industrial coatings, automotive coatings, radiation-curable coatings, paints, including paints for building exteriors and building interiors, for example wood paints, lime washes, distempers and emulsion paints. The powders and dispersions can also be used for coloring waterborne printing inks, for example offset printing inks, flexographic printing inks, textile printing inks, radiation-curable printing inks, inkjet inks and color filters.

As explained above, the aqueous dispersions of pigment-polymer particles of the invention may be included into an aqueous coating composition. Such a coating composition contains the pigment-polymer particles, the dispersant, an aqueous liquid diluent and additionally one or more binders, e.g. film-forming polymers or prepolymers which form a film upon drying or curing. Coating compositions may optionally contain conventional additives conventionally used in coating technology, e.g. plasticisers, lubricants, emulsifiers, rheology additives, catalysts, flow auxiliaries, optical brighteners, flame retardants, preservatives, fillers, antistatic agents or blowing agents.

Suitable binders are the ones customarily used, for example, the ones described in Ullmann's Encyclopedia of Industrial Chemistry, 5th Edition, Vol. A18, pp. 368-426, VCH, Weinheim 1991, Germany. In general, the film-forming binder is based on a thermoplastic or thermosetting resin. Examples thereof are alkyd, acrylic, polyester, phenolic, melamine, epoxy and polyurethane resins, in particular polymer latices obtained by emulsion polymerization, and mixtures thereof. Resins curable by radiation can also be used.

If cold- or hot-curable binders are used, the addition of a curing catalyst may be advantageous. Suitable catalysts that accelerate the curing of binders are described, for example, in Ullmann's, Vol. A18, loc. cit., p. 469.

The invention is hereinafter also described by way of examples.

Particle Size Distribution (PSD) was determined by laser diffraction using a Malvern Mastersizer 2000 according to European norm ISO 13320:2009 EN. The data were treated according to the Mie-Theory by software using a "universal model" provided by Malvern Instruments. Important parameters are the $d_n$-values for n=10, 50 and 90, the $d_{10}$, $d_{50}$ and $d_{90}$.

Aminoplast pre-condensate 1: 70 wt.-% aqueous solution of a methylolated melamine formaldehyde pre-condensate (Luracoll® SD of BASF SE).

Aminoplast pre-condensate 2: 65 wt.-% aqueous solution of an urea formaldehyde pre-condensate (Kaurit 325 of BASF SE).

Pigment 1: bluish red diketopyrrolopyrrole pigment (PR 264): Irgazine® Rubine L 4025

Pigment 2: bluish green copper-phthalocyanine pigment (PG 36): Heliogen® Green D 9360

Dispersant A: 50% aqueous solution of a copolymer having repeating units of butyl acrylate, methylpolyethylenoxide acrylate and vinylpyridine, prepared according to example A6 of WO 2006/074969.

In examples 1 and 6, a stirred media mill of Bühler (PML Drais) having an internal volume of 940 ml and a disc agitator was used for milling. A sieve (200 mm) was installed inside the mill at the outlet. The diameter of the grinding media was 0.6 mm-0.8 mm. The filling degree of the grinding media was 80%. The mill was operated at a tip speed of 12 m/s.

For examples 7 to 14, a stirred media mill of Netzsch (MicroCer) having an internal volume of 80 mL and a ZETA agitator was used. A sieve with mesh size of 200 μm was installed inside the mill at the outlet. The filling degree of the grinding media was 62.5%.

EXAMPLE 1 a) 4 kg of an aqueous suspension containing 20 wt-% of pigment 1 and 20 wt-% of dispersant A were stressed for four hours in the stirred media mill until the particle size of the pigment was as follows: d(v 0.5)=45 nm, d(v 0.9) 128 nm.

b) 72 g of the aqueous suspension obtained in step a) were transferred into a reaction vessel equipped with a stirrer. 83.4 g distilled water, 1.63 g of the amino plast pre-condensate 1 as well as 1.6 g of a 20 wt-% aqueous solution of formic acid were added. The suspension was stirred for 5 hours and 40 minutes at 50° C. Afterwards, the pH was adjusted to pH 7 with triethanolamine. The particles in the obtained pigment dispersion had the following size: d(v 0.5)=112 nm, d(v 0.9) 187 nm.

EXAMPLE 2

68.3 g of the aqueous suspension obtained in step a) of example 1 were transferred into a reaction vessel equipped with a stirrer. 70.04 g distilled water, 0.71 g of the amino plast pre-condensate 1 as well as 1.47 g of a 20 wt-% aqueous solution of formic acid were added. The suspension was stirred for 5 hours and 40 minutes at 50° C. Afterwards, the pH was adjusted to 7 with triethanolamine. The particles in the obtained pigment dispersion had the following size: d(v 0.5)=56 nm, d(v 0.9) 124 nm.

EXAMPLE 3

71.26 g of the aqueous suspension obtained in step a) of example 1 were transferred into a reaction vessel equipped with a stirrer. 73.86 g distilled water, 1.14 g of the amino plast pre-condensate 2 as well as 1.58 g of a 20 wt-% aqueous solution of formic acid were added. The suspension was stirred for 5 hours and 40 minutes at 50° C. Afterwards, the pH was adjusted to 7 with triethanolamine. The particles in the obtained pigment dispersion had the following size: d(v 0.5)=79 nm, d(v 0.9) 139 nm.

EXAMPLE 4 a) 4 kg of an aqueous suspension containing 10 wt-% of pigment 2 and 10 wt-% of dispersant A were stressed for four hours in the stirred media mill until the particle size of the pigment was as follows: d(v 0.5)=77 nm, d(v 0.9) 471 nm.

b) 112 g of the aqueous suspension obtained in step a) were transferred into a reaction vessel equipped with a stirrer. 14.29 g distilled water, 5.72 g of the amino plast pre-condensate 1 as well as 11.2 g of a 20 wt-% aqueous solution of formic acid were added. The suspension was stirred for 5 hours and 40 minutes at 50° C. Afterwards, the pH was adjusted to pH 7 with triethanolamine. The particles in the obtained pigment dispersion had the following size: d(v 0.5)=79 nm, d(v 0.9) 139 nm.

EXAMPLE 5 a) 2 kg of water based pigment suspension (5 wt-% pigment 1, 5 wt-% dispersant A) were milled for 2 hours at a tip speed of 12 m/s using 0.6 mm-0.8 mm grinding beads. After 2 h, the grinding media was exchanged to beads of 0.1 mm-0.2 mm, and the sieve was changed to a 50 μm sieve. The suspension was stressed for further 3 hours. After grinding, the particle size of the pigment was as follows: d(v 0.5)=52 nm, d(v 0.9) 130 nm.

b) For polymerization during milling, the stirred media mill of step a) was filled with grinding beads of 0.6-0.8 mm (filling degree 62.5%), and the sieve was again changed to a sieve with mesh size of 200 μm. 650 ml of the ground suspension obtained in step a) were added into the stirred media mill as well as 3.25 g of the aminoplast pre-condensate. The suspension was heated to 80° C. Formic acid (20%) was added to the suspension until a pH of 3.5 was obtained. The suspension was then stressed at a tip speed of 5 m/s for two further hours at 80° C. The particle size of the polymer-pigment particles obtained was as follows:
d(v 0.5)=1.87 μm, d(v 0.9)=6.52 μm.

EXAMPLE 6

Composition, grinding and polymerization conducted as described in example 5, however, the tip speed during the polymerization in step b) was adjusted to 12 m/s. The particle size of the polymer-pigment particles obtained in step b) was as follows: d(v 0.5)=2.37 μm, d(v 0.9)=8.55 μm.

EXAMPLE 7 a) 1.5 kg of water based pigment suspension (20 wt-% pigment 1, 20 wt-% dispersant A) was milled for 5 hours at a speed of 12 m/s with 0.6 mm-0.8 mm grinding beads. After grinding, the particle size of the pigment was as follows: d(v 0.5)=67 nm, d(v 0.9) 150 nm.

b) For polymerization during milling, the stirred media mill of step a) was filled with grinding beads of 0.6-0.8 mm (filling degree 62.5%), and the sieve was again changed to a sieve with mesh size of 200 μm. 300 g of suspension as obtained in step a), 293 g of distilled water and 6.83 g of the aminoplast pre-condensate were introduced into the stirred media mill. The suspension was heated to 50° C. Formic acid (10%) was added to the suspension until a pH of 3.5 was obtained. The suspension was then stressed at a tip speed of 5 m/s for 6 further hours at 50° C. The particle size of the polymer-pigment particles obtained was as follows: d(v 0.5)=67 nm, d(v 0.9)=145 nm.

EXAMPLE 8

Composition, grinding and polymerization conducted as described in example 7, however, the tip speed during the polymerization in step b) was adjusted to 12 m/s. The particle size of the polymer-pigment particles obtained in step b) was as follows: d(v 0.5)=81 nm, d(v 0.9)=150 nm.

EXAMPLE 9

For polymerization during milling, the stirred media mill used in step a) of example 7 was filled with grinding beads of 0.6-0.8 mm (filling degree 62.5%), and the mill was equipped with a sieve with mesh size of 200 μm. 300 g of suspension as obtained in step a) of example 9, 293 g of distilled water and 27.32 g of the aminoplast pre-condensate were introduced into the stirred media mill. The suspension was heated to 50° C. Formic acid (10%) was added to the suspension until a pH of 3.5 was obtained. The suspension was then stressed at a tip speed of 5 m/s for 6 further hours at 50° C. The particle size of the polymer-pigment particles obtained was as follows: d(v 0.5)=64 nm, d(v 0.9)=146 nm.

EXAMPLE 10 a) 1.5 kg of water based pigment suspension (10 wt-% pigment 2, 10 wt-% dispersant A) was milled for 6 hours at a speed of 12 m/s with 0.6 mm-0.8 mm grinding beads. After 6 hours, the grinding media was exchanged to beads of 0.2 mm-0.3 mm. The suspension was stressed for further 16 hours. After grinding, the particle size of the pigment was as follows: d(v 0.5) =118 nm, d(v 0.9) 230 nm.

b) For polymerization during milling, the stirred media mill of step a) was filled with grinding beads of 0.6-0.8 mm (filling degree 62.5%). 600 g of suspension as obtained in step a) and 6.83 g of the aminoplast pre-condensate were introduced into the stirred media mill. The suspension was heated to 50° C. Formic acid (10%) was added to the suspension until a pH of 3.5 was obtained. The suspension was then stressed at a tip speed of 5 m/s for 6 further hours at 50° C. The particle size of the polymer-pigment particles obtained was as follows: d(v 0.5)=139 nm, d(v 0.9)=237 nm.

EXAMPLE 11

For polymerization during milling, the stirred media mill used in step a) of example 7 was filled with grinding beads of 0.6-0.8 mm (filling degree 62.5%), and the mill was equipped with a sieve with mesh size of 200 μm. 600 g of suspension as obtained in step a) of example 12 and 27.32 g of the aminoplast pre-condensate were introduced into the stirred media mill. The suspension was heated to 50° C. Formic acid (10%) was added to the suspension until a pH of 3.5 was obtained. The suspension was then stressed at a tip speed of 5 m/s for 6 further hours at 50° C. The particle size of the polymer-pigment particles obtained was as follows: d(v 0.5)=131 nm, d(v 0.9)=290 nm.

EXAMPLE 12

Composition, grinding and polymerization conducted as described in example 11, however, the tip speed during the polymerization in step b) was adjusted to 12 m/s. The particle size of the polymer-pigment particles obtained in step b) was as follows: d(v 0.5)=235 nm, d(v 0.9)=274 nm.

We claim:

1. A process for preparing an aqueous dispersion of pigment-polymer particles containing an organic pigment and an aminoplast resin which surrounds or embeds the organic pigment, the process comprising:
    i) subjecting an aqueous suspension of an organic pigment in the form of coarse particles to milling in order to comminute the coarse particles in the presence of a polymer dispersant to a particle diameter d(v 0.9) of below 1500 nm, as determined by laser scattering;
    ii) performing a polycondensation of an aminoplast pre-condensate in the aqueous suspension obtained in i) or during the milling of i), thereby obtaining the aqueous dispersion of pigment-polymer particles;
    wherein the polycondensation is performed in the presence of an acid catalyst at pH of below 5.5.

2. The process of claim 1, wherein the aminoplast pre-condensate is selected from the group consisting of a melamine formaldehyde pre-condensate, a urea formaldehyde pre-condensate, and a mixture thereof.

3. The process of claim 2, wherein the aminoplast pre-condensate comprises an etherified melamine formaldehyde pre-condensate.

4. The process of claim 1, wherein the dispersant is a nonionic polymer containing a plurality of poly(oxy-$C_2$-$C_4$-alkylene) groups.

5. The process of claim 4, wherein the dispersant is a comb polymer containing both repeating units bearing a poly(oxy-$C_2$-$C_4$-alkylene) group and repeating units derived from vinyl pyridine units.

6. The process of claim 1, where an amount of the dispersant is from 0.1 to 4.0 parts by weight, per 1 part of the pigment.

7. The process of claim 1, wherein the milling of i) is performed in the presence of at least a portion of the aminoplast pre-condensate subjected to the polycondensation of ii).

8. The process of claim 1, wherein no aminoplast pre-condensate subjected to the polycondensation of ii) is present in the aqueous suspension during the milling of i).

9. The process of claim 1, which satisfies at least one of the following a.1 to a.6:
   a.1 the milling in i) is performed in a stirred media mill;
   a.2 a concentration of the pigment in the aqueous suspension of i) is from 5 to 60% by weight;
   a.3 an amount of the aminoplast pre-condensate is from 1 to 60% by weight, based on the organic pigment to be encapsulated;
   a.4 the polycondensation of the aminoplast pre-condensate in the aqueous suspension obtained in i) is performed at a pH ranging from 1 to 4;
   a.5 the acid catalyst is selected from the group consisting of formic acid, sulfuric acid, methane sulfonic acid, and hydrochloric acid; and
   a.6 the aqueous dispersion of pigment-polymer particles obtained in ii) is neutralized by adding a base.

10. The process of claim 1, wherein the polycondensation is performed at a temperature of at most 60° C.

11. The process of claim 1, wherein the aqueous suspension is milled during the polycondensation of ii).

12. The process of claim 1, wherein the organic pigment is selected from the group consisting of a monoazo pigment, a disazo pigment, a disazo condensation pigment, an anthanthrone pigment, an anthraquinone pigment, an anthrapyrimidine pigment, a quinacridone pigment, a quinophthalone pigment, a diketopyrrolopyrrole pigment, a dithioketopyrrolopyrrol pigment, a dioxazine pigment, a flavanthrone pigment, an indanthrone pigment, an isoindoline pigment, an isoindolinone pigment, an isoviolanthrone pigment, a metal complex pigment of an azo metal complex pigment and an azomethine metal complex pigment, a perinone pigment, a perylene pigment, a phthalocyanine pigment, a pyranthrone pigment, a pyrazoloquinazolone pigment, an indigo pigment, a thioindigo pigment, a triarylcarbonium pigment, and a combination thereof.

13. An aqueous dispersion of pigment-polymer particles, obtained by the process of claim 1, wherein the pigment-polymer particles have a particle diameter d(v 0.9) of below 2.0 μm, as determined by laser scattering.

14. The aqueous dispersion of claim 13, wherein the pigment-polymer particles have a volume average particle diameter d(v 0.5) of from 10 to 1000 nm, as determined by laser scattering.

15. The aqueous dispersion of claim 13, which satisfies at least one of the following x.1 to x.4:
   x.1: the dispersant is a nonionic polymer containing a plurality of poly(oxy-$C_2$-$C_4$-alkylene) groups;
   x.2: an amount of the dispersant is from 0.1 to 4 parts by weight per 1 part of the pigment-polymer particles;
   x.3: an amount of the dispersant is from 0.2 to 2.0 parts per 1 part of the pigment-polymer particles; and
   x.4: an amount of the dispersant is from 0.25 to 1.3 parts per 1 part of the pigment-polymer particles.

16. A tinting waterborne coating composition, comprising:
   the aqueous dispersion of claim 13.

* * * * *

UNITED STATES PATENT AND TRADEMARK OFFICE
CERTIFICATE OF CORRECTION

PATENT NO. : 11,084,951 B2
APPLICATION NO. : 16/605700
DATED : August 10, 2021
INVENTOR(S) : Winkelmann et al.

Page 1 of 1

It is certified that error appears in the above-identified patent and that said Letters Patent is hereby corrected as shown below:

In the Specification

In Column 4, Line 14, delete ""polalkyleneoxide" and insert -- "polyalkyleneoxide --, therefor.

In Column 7, Line 22, delete "triazintrione" and insert -- triazinetrione --, therefor.

In Column 8, Line 32, delete "poly(oxy-$C_2$-$C_4$-alkylene)" and insert -- poly(oxy-$C_2$-$C_3$-alkylene) --, therefor.

In Column 11, Line 61, delete "iron-anganese" and insert -- iron-manganese --, therefor.

In Column 13, Line 51, delete "alkandiol," and insert -- alkanediol, --, therefor.

In Column 13, Line 53, delete "$C_2$-$C_4$-alkandiol," and insert -- $C_2$-$C_4$-alkanediol, --, therefor.

Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*